United States Patent
Lin et al.

[11] Patent Number: 6,036,227
[45] Date of Patent: Mar. 14, 2000

[54] VEHICLE HEADLINER WITH IMPACT PROTECTION

[75] Inventors: Tong Ching Lin, Ann Arbor; Robert N. Baker, Utica, both of Mich.

[73] Assignee: General Motors Corporation, Detroit, Mich.

[21] Appl. No.: 09/028,167

[22] Filed: Feb. 23, 1998

[51] Int. Cl.$^7$ .................................................. B60R 21/04
[52] U.S. Cl. ........................................ 280/751; 188/377
[58] Field of Search .................................. 280/751, 748, 280/752; 188/377, 371; 296/189, 39.1, 146.6; 428/181, 182

[56] References Cited

U.S. PATENT DOCUMENTS

| | | | |
|---|---|---|---|
| 3,444,962 | 5/1969 | Lech ......................................... | 188/371 |
| 4,221,413 | 9/1980 | Bonnetain ................................ | 293/122 |
| 4,570,964 | 2/1986 | Tatay et al. ............................. | 280/403 |
| 4,974,820 | 12/1990 | Nakamishi .............................. | 267/152 |
| 5,151,312 | 9/1992 | Boeri ....................................... | 428/156 |
| 5,435,619 | 7/1995 | Nakea et al. ............................ | 296/189 |
| 5,884,962 | 3/1999 | Mattingly et al. ...................... | 296/189 |

*Primary Examiner*—Christopher P. Ellis
*Assistant Examiner*—Faye M. Fleming
*Attorney, Agent, or Firm*—Charles E. Leahy

[57] ABSTRACT

An energy absorption material for covering a rigid vehicle support surface provide impact protection for a vehicle occupant's head is a sheet of material formed into a waveform comprising a plurality of regular corrugations which have identical crests and valleys connected by inclined sidewalls. The material thickness of the crests and valleys is the same and thicker than that of the sidewall material. The crests and valleys are curved such that the inside radius of each of the crests is smaller than the inside radius of each of the valleys, so that the sidewalls adjacent a valley are laterally closer than the sidewalls adjacent a crest. The corrugations have a pitch equal to their height. This construction provides a deformation mode of the material in which the crests and valleys deform by bending and the sidewalls deform by buckling. The material can contain a plurality of perforations, covering 7%–15% of the area for sound absorption.

8 Claims, 4 Drawing Sheets

VEHICLE HEADLINER WITH IMPACT PROTECTION

BACKGROUND OF THE INVENTION

This invention relates generally to vehicle headliners and, more particularly, to a headliner having impact protection for vehicle passengers.

Safety measures for vehicle passengers in the event of an impact have become more comprehensive. Federal regulations have become increasingly more stringent, especially regarding energy absorption of passenger head impact. For example, the Laboratory Test Procedure for FMVSS 201 requires that future passenger cars and other light vehicles achieve a head impact energy absorption performance requirements as determined by the following:

The HIC(d) shall not exceed 1000 when calculated in accordance with the following formula:

HIC(d)=0.75446 (Free Motion Headform HIC)+164 HIC calculated by the following formula:

$$HIC = \left[\frac{1}{t_2 - t_1}\int_{t_1}^{t_2} a\, dt\right]^{2.5}(t_2 - t_1)$$

where $t_1$ and $t_2$ are any two points in time during the impact event separated by no more than a 36 millisecond time period, and a is the resultant acceleration at the head center of gravity (c.g.).

These new standards require that the structure above the vehicle beltline (bottom of glass) subject to occupant head impact be modified to meet these standards. Many materials were investigated for impact energy absorption, but were found to be too bulky and/or expensive for use in the confines of a modern vehicle interior, where space is a tightly-rationed commodity. In addition, it is necessary to retain a sufficient amount of sound absorption to provide a quiet environment inside an automobile.

Since space is limited, it is desirable to develop a material which can meet these stringent energy absorption standards and still provide sufficient sound isolation characteristics.

SUMMARY OF THE INVENTION

It is therefore an object of this invention to provide a material which can meet these stringent energy absorption standards and still provide sufficient sound isolation characteristics.

This invention features an energy absorption material for covering a rigid vehicle support surface to provide impact protection for a vehicle occupant's head. The material comprises a sheet of material formed into a waveform of a plurality of regular corrugations which have identical crests and valleys connected by inclined sidewalls. The material of the crests and valleys is thicker than the material of the sidewalls. The deformation mode of the material of the crests and valleys is bending and the deformation mode of the sidewalls is buckling.

In one aspect of this invention, the crests and valleys of the material are curved such that the inside radius of each of the crests is smaller than the inside radius of each of the valleys, so that the sidewalls adjacent a valley are laterally closer than the sidewalls adjacent a crest.

In another aspect of this invention, the valley side of the material is located adjacent the support such that the crest side is impacted by the vehicle occupant's head. Preferably, the material at the crests and at the valleys are of the same thickness.

In yet another aspect of this invention, the material contains a plurality of perforations or slots to provide sound absorption. Preferably, the perforations comprises 7%–15% of the material open area.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
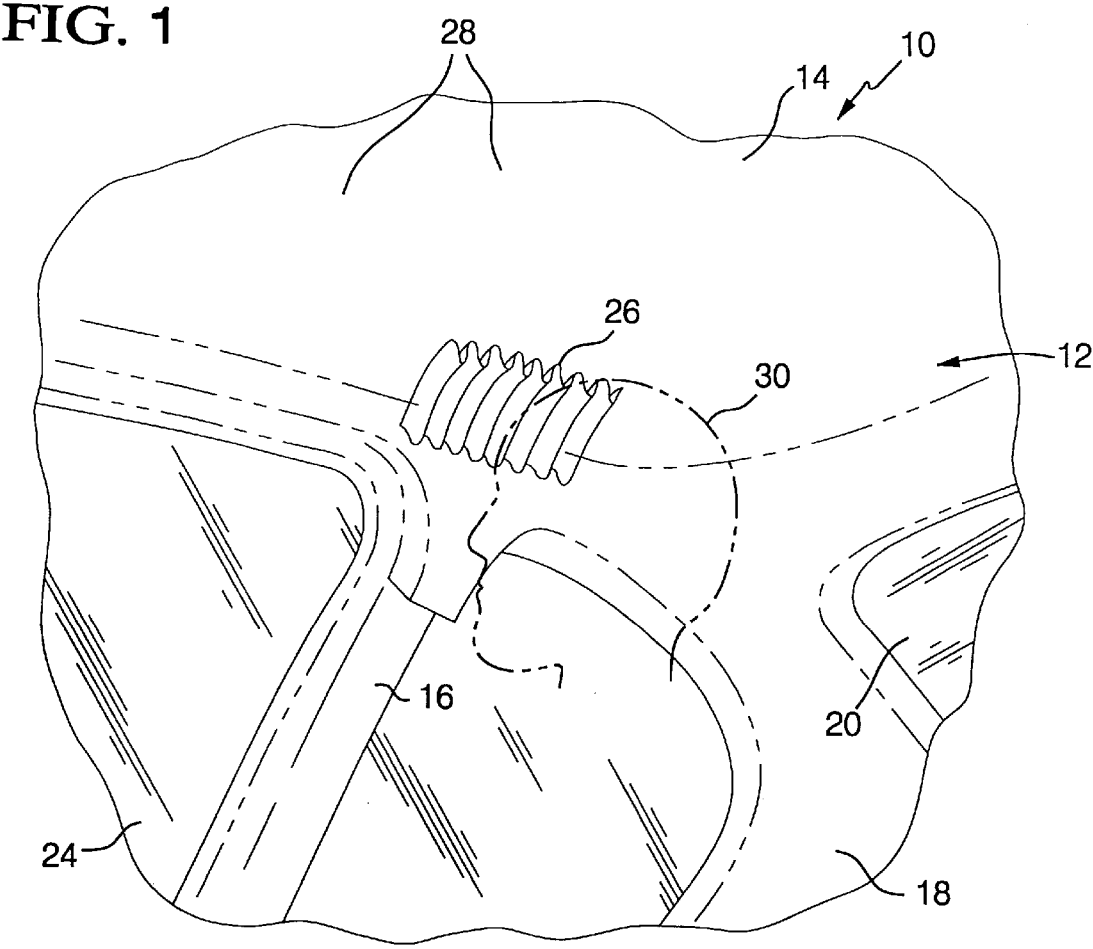
FIG. 1 is a partial perspective view of the "B" pillar areas of an automobile interior, illustrating an impact-absorbing material according to this invention.

Referring now to FIG. 1 of the drawings, an automobile 10 has a passenger compartment 12 partially defined by a roof 14, a "B" pillar 16, a "C" pillar 18, a backlight 20, and side windows 22 and 24. A piece of impact-absorbing headliner material 26 is mounted on the metal structural support surface 28 at the juncture of "B" pillar 16 and roof 14. This is the location of likely impact by the head 30 of an occupant during an automobile crash scenario.

Figure 2:
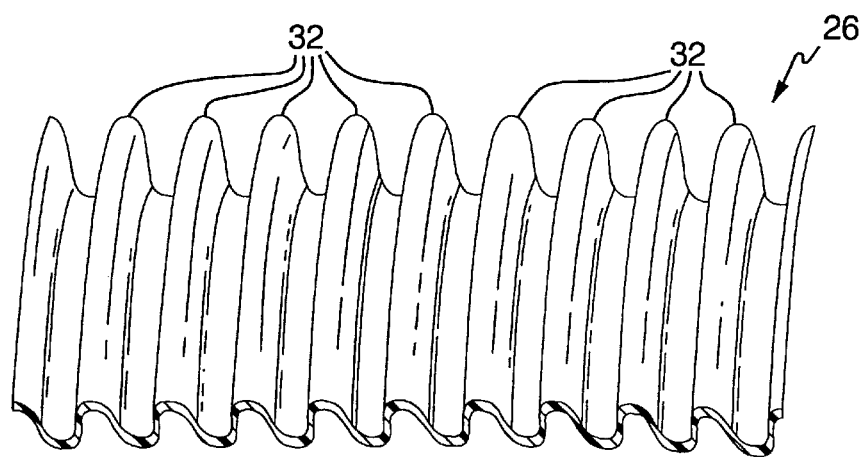
FIG. 2 is an enlarged view of the impact-absorbing headliner material of FIG. 1.
Figure 3:
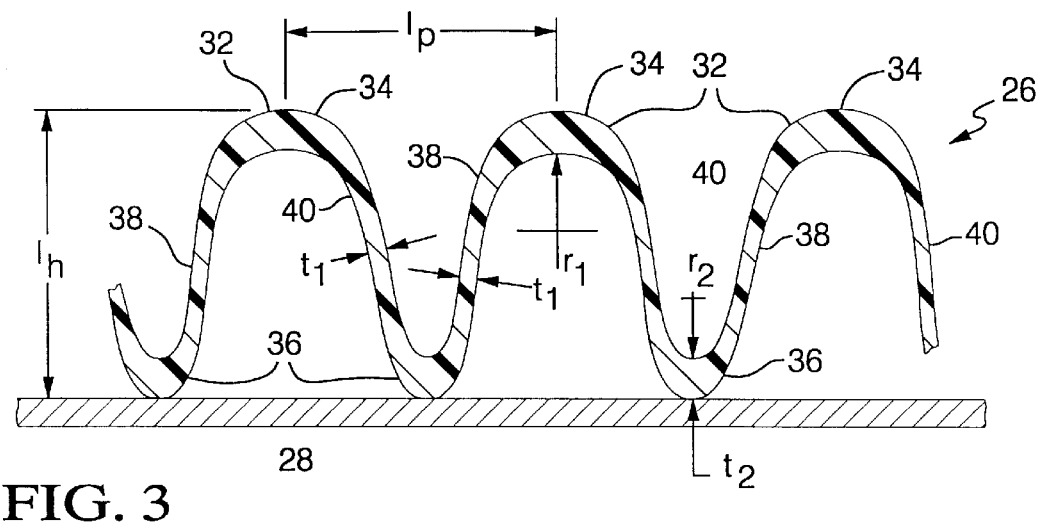
FIG. 3 is a transverse sectional view of a portion of the material of FIGS. 1 and 2.

As best shown in FIGS. 2 and 3, material 26 comprises a sheet of polyurethane having a plurality of identical corrugations 32 which comprise a series of crests 34 and valleys 36 interconnected by spaced sidewalls 38 and 40. Material 26 is oriented so that the smaller valleys 36 form the mounting side in contact metal support surface 28 and the larger crests 34 form the impact side exposed for impact by a passenger.

Figure 5:
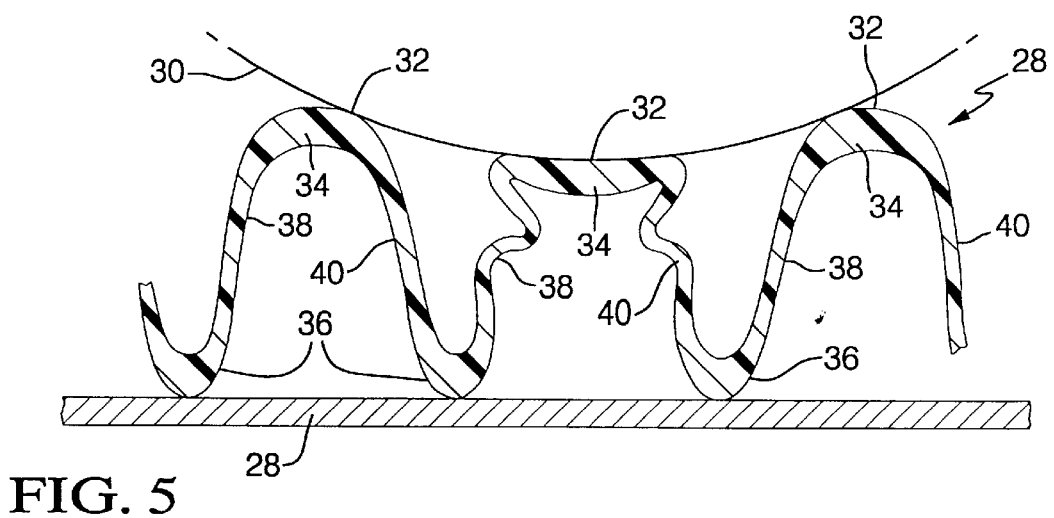
FIG. 5 is a view similar to FIG. 3, illustrating an initial stage of material deformation upon impact.
Figure 6:
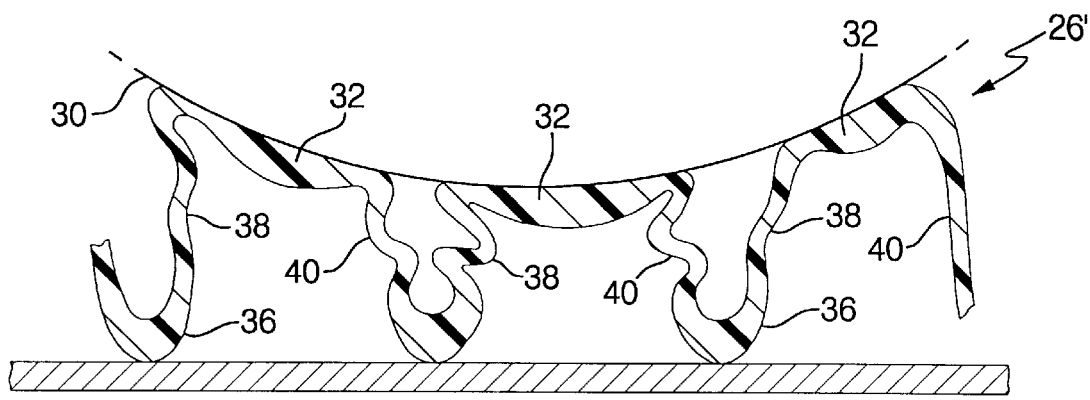
FIG. 6 is a view similar to FIG. 5, illustrating a later stage of material deformation.

The crush profile of material 26 is illustrated in FIGS. 5 and 6. Initial contact of material 26 by head 30 (FIG. 5) results in a crumpling of the sidewalls 38 and 40 of the central corrugation 32, accompanied by bending of connecting crest 34. Upon further impact (FIG. 6), outer crests 34 begin bending, accompanied by crumpling of connecting sidewalls 38 and 40 and a bending of valleys 36.

The corrugations have a height $l_h$ and a pitch $l_p$. Crests 34 and valleys 36 each have a thickness $t_2$. Crests 34 have an inside radius $r_1$ which is larger than the inside radius $r_2$ of each of the valleys. Sidewalls 38 and 40 each have the same thickness $t_1$ which is less than the thickness $t_2$. Actual dimensions are dependent upon the actual material and installation. In one example, polyurethane was formed into corrugations having the following dimensions:

$t_1$=1.45 mm $t_2$=2.65 mm $r_1$=4.75 mm $r_2$=2.00 mm $l_p$=20.00 mm $l_h$=20.00 mm.

The interrrelationships of the dimensions of this material construction are:

$l_h=l_p$; $r_2=1.101_h$; $r_1=2.735r_2$; $t_1=0.0725l_h$; $t_2=0.828t$

This construction produces the illustrated crush profile which enables energy absorption in conformance with FMVSS 201 during impact. This is illustrated by the results of three crash tests shown in FIGS. 7a, 7b, and 7c which were conducted with the example material detailed above. These charts plot acceleration of the test headform versus time to compare with the requirements of FMVSS 201.

Figure 7A:
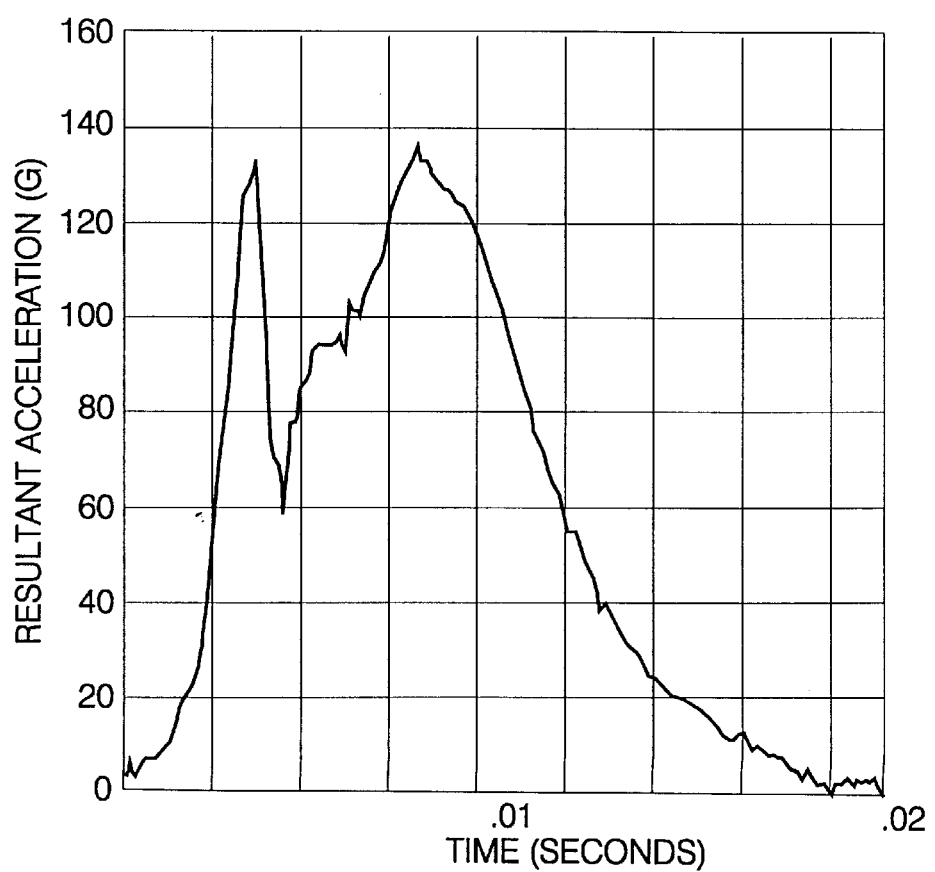
FIGS. 7a, 7b and 7c are charts, each illustrating object deceleration versus time of three different objects upon impact with the material of this invention.

Test I produced the accelerations shown in the chart of FIG. 7a, where $t_1$=2.45 msec and $t_2$=10.16 msec. This resulted in HIC=818.26, calculated over a period of 7.7 msec., producing HIC(d)=783, well within the requirements of FMVSS 201.

Figure 7B:
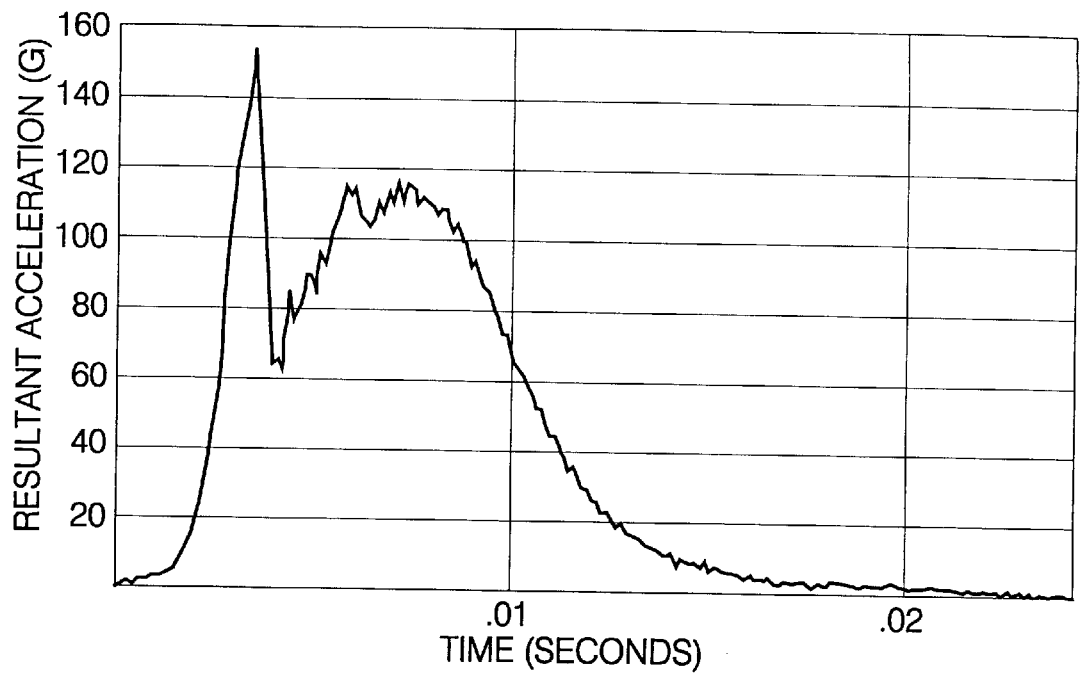
Figure 7C:
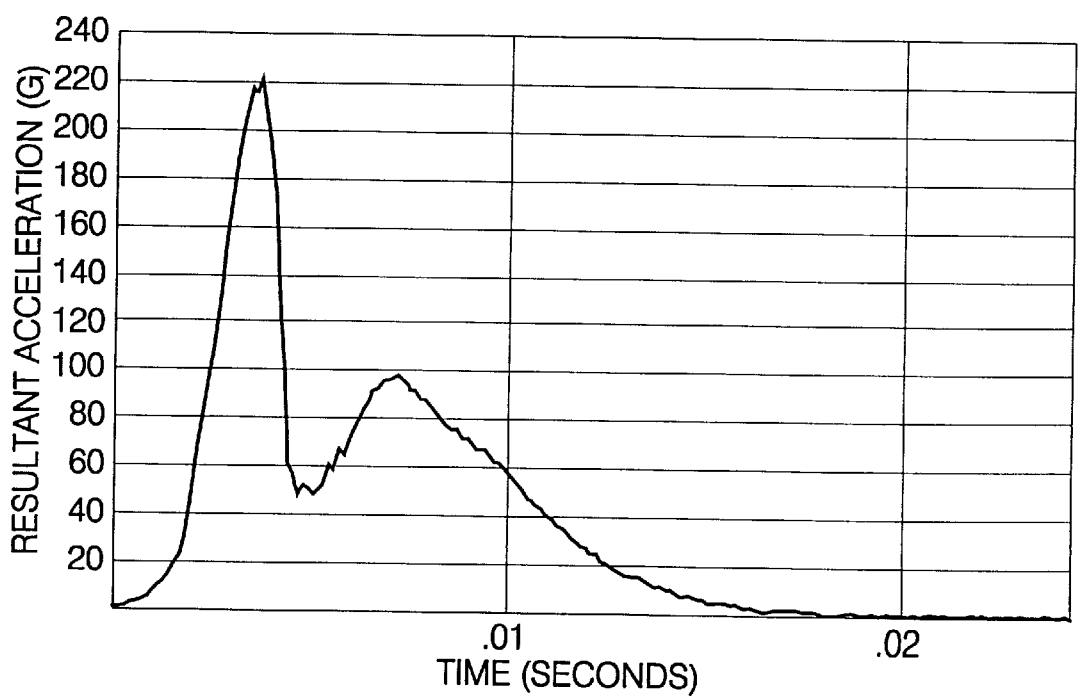

Test II produced the accelerations shown in the chart of FIG. 7b, where $t_1$=2.45 msec and $t_2$=10.28 msec. This resulted in HIC=775.84, calculated over a period of 7.7 msec., producing HIC(d)=752, well within the requirements of FMVSS 201.

Test III produced the accelerations shown in the chart of FIG. 7b, where $t_1$=2.33 msec and $t_2$=4.17 msec. This resulted in HIC=753.83, calculated over a period of 1.8 msec., producing HIC(d)=735, well within the requirements of FMVSS 201.

Figure 4:
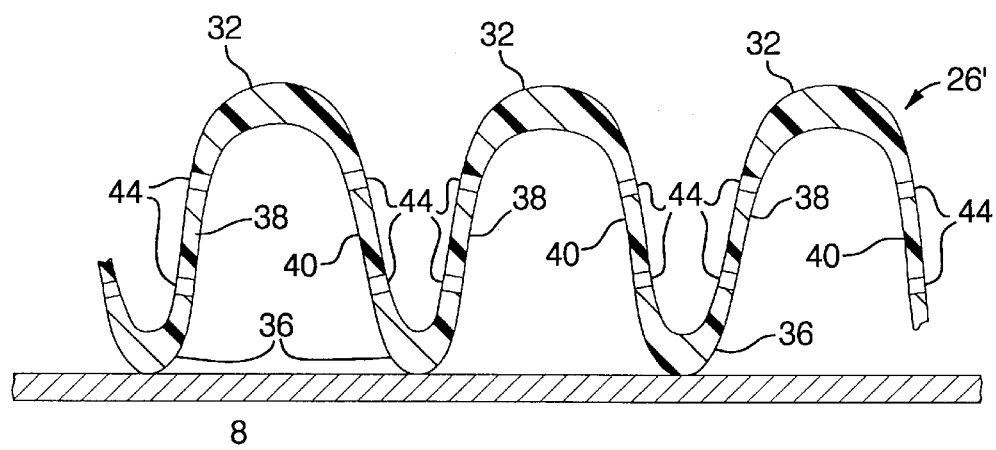
FIG. 4 is a view similar to FIG. 3, illustrating a modified form of material having sound-absorbing perforations.

It has also been found that this material can be modified for sound absorption. This is very important in today's automobiles in which interior space and weight are severely limited. Such a material is shown in FIG. 4 in which the sidewalls 38' and 40' of material 26' have been modified to include perforations or slots 44. Preferably, perforations 44 comprise 7%–15% of the surface area and have a diameter and area percentage as determined by the equation:

$$F_h = (c/2\pi)\sqrt{p/(a(1+0.85d))},$$

where $F_h$=Helmholtz resonance frequency in Hz
c=speed of sound, taken as 13,500 inches per second
p=fraction of open area due to perforations
a=thickness of back space in inches
l=thickness of material in inches
d=diameter of perforation in inches.

While only a preferred embodiment has been illustrated and described, obvious modifications thereof are contemplated within the scope of this invention and the following claims.

We claim:

1. An energy absorption material for covering a rigid vehicle support surface to provide impact protection for a vehicle occupant's head, comprising a sheet of material formed into a waveform of a plurality of regular corrugations which have identical crests and valleys connected by inclined sidewalls, characterized by the material of the crests and valleys being thicker than the material of the sidewalls, and by the deformation mode of the material of the crests and valleys being bending and the deformation mode of the sidewalls being buckling.

2. The energy absorption material of claim 1, further characterized by the crests and valleys being curved such that the inside radius of each of the crests is smaller than the inside radius of each of the valleys, so that the sidewalls adjacent a valley are laterally closer than the sidewalls adjacent a crest.

3. The energy absorption material of claim 2, further characterized by the material at the crests and at the valleys being of the same thickness.

4. The energy absorption material of claim 3, further characterized by the corrugations of the material having a pitch equal to their height.

5. The energy absorption material of claim 4, further characterized by the material being polyurethane having the following dimensional relationships:

$l_h=l_p$; $r_2=0.101_h$; $r_1=2.735r_2$;
$t_1=0.0725l_h$; and $t_2=1.83t_1$, where
$l_h$ is the height of the corrugations.
$l_p$ is the pitch of the corrugations,
$r_1$ is the inside radius of the crests,
$r_2$ is the inside radius of the valleys,
$t_1$ is the thickness of the sidewalls, and
$t_2$ is the thickness of the crests and valleys.

6. The energy absorption material of claim 5, further characterized by the valley side of the material is located adjacent the support such that the crest side is impacted by the vehicle occupant's head.

7. The energy absorption material of claim 1, further characterized by the material containing a plurality of perforations for sound absorption.

8. The energy absorption material of claim 7, further characterized by the perforations comprising 7%–15% of the material open area, the holes being of a diameter and area percentage as determined by the equation:

$$F_h = (c/2\pi)\sqrt{p/(a(1+0.85d))},$$

where $F_h$=Helmholtz resonance frequency in Hz,
c=speed of sound, taken as 13,500 inches per second,
p=fraction of open area due to perforations,
a=thickness of back space in inches,
l=thickness of material in inches, and
d=diameter of perforation in inches.

* * * * *